United States Patent [19]

Curtis et al.

[11] 4,331,832
[45] May 25, 1982

[54] ELECTRICAL OUTLET BOX

[75] Inventors: John S. Curtis, Mayfield Heights, Ohio; Albert Hurst, New Smyrna Beach, Fla.

[73] Assignee: Sedco Pipe Products, Inc., Cleveland, Ohio

[21] Appl. No.: 111,035

[22] Filed: Jan. 10, 1980

[51] Int. Cl.³ .............................................. H02G 3/12
[52] U.S. Cl. ..................................... 174/57; 220/3.4; 220/3.7; 220/3.8
[58] Field of Search ........................ 220/3.4, 3.8, 3.7; 174/57, 86

[56] References Cited

U.S. PATENT DOCUMENTS

| | | | |
|---|---|---|---|
| 1,928,198 | 9/1933 | Buchanan | 220/3.4 X |
| 2,033,602 | 3/1936 | Adam | 174/57 |
| 3,027,416 | 3/1962 | Kissel | 174/57 |
| 3,081,896 | 3/1963 | Hoskins | 220/3.4 |
| 3,296,361 | 1/1967 | Markland | 174/86 |
| 3,343,704 | 9/1967 | Terry | 220/3.8 X |
| 3,392,228 | 7/1968 | Zerwes | 220/3.8 X |
| 3,912,106 | 10/1975 | Traupe | 220/3.7 X |
| 4,163,137 | 7/1979 | Close, Jr. | 174/66 X |

FOREIGN PATENT DOCUMENTS

| | | | |
|---|---|---|---|
| 220212 | 3/1962 | Austria | 220/3.7 |
| 675429 | 7/1952 | United Kingdom | 174/57 |

*Primary Examiner*—Allan N. Shoap
*Attorney, Agent, or Firm*—Maky, Renner, Otto & Boisselle

[57] ABSTRACT

An electrical outlet floor box including an upright, open top cylindrical housing member, a ball ring, and a cover assembly secured to the open top of the housing member by means of the ball ring; said housing member is embedded in a concrete floor and the upper portion removed in proximity to, and in a plane parallel to, the surface of the concrete. The ball ring insures that the upper surface of the cover assembly is parallel to the surface of the concrete floor even if the axis of the cylindrical housing member deviates somewhat from normality to the surface of the concrete floor.

8 Claims, 4 Drawing Figures

ELECTRICAL OUTLET BOX

BACKGROUND OF THE INVENTION

This invention relates to an improved electrical outlet floor box to be embedded in a poured concrete or the like floor, which has a cover assembly secured to the open top of a cylindrical housing member by a ball ring, enabling the upper surface of the cover assembly to remain parallel to the surface of the floor notwithstanding a deviation from normality of the cylindrical housing member's axis with respect to the surface of the floor.

In the past, electrical outlet floor boxes were of fixed height and the electrical outlet floor box cover assemblies had a fixed angular relationship with the rest of the floor box. This meant that unless the boxes were firmly anchored during the concrete pouring process, and unless the time consuming processes of leveling and grade shooting were employed, the boxes were often bumped into a non-vertical alignment and, at worst, would be buried by the concrete and, at best, the box cover would not be parallel or flush with the floor.

One solution to the above problem is provided by the Terry U.S. Pat. No. 3,343,704, which discloses an electrical outlet floor box with an elongated, cylindrical portion which may be sawed either flush with, or, at desired height from and parallel to the floor. The elongated cylindrical portion of the floor box makes it unlikely that the box will be buried during the concrete pouring process. The Terry patent solution to the problem of properly orienting the upper surface of the floor box to a floor surface when the cylindrical member has been knocked out of vertical alignment, is to provide a cover assembly having two downward projections upon which a ring is pivotally mounted. The ring is coaxially inserted within, and then cemented to the inside walls of, the cylindrical member. The cover assembly pivots on a single axis about the ring allowing it to remain flush or parallel with the floor. This ability to pivot about a single axis only, means that if the electrical outlet floor box has been tilted, the pivotally mounted ring must be cemented in place in a manner such that the axis running through the pivot is at right angles to the direction of tilt of the box. Extra time must then be spent adjusting the ring's pivotal axis, a job made more difficult when the direction of tilt of the electrical outlet floor box is not readily apparent.

SUMMARY OF THE INVENTION

The general purpose of this invention is to provide an electrical outlet floor box which embraces all of the advantages of similarly employed prior art devices, yet, is of simpler construction and easier to install.

A principal object of the present invention is the provision of an electrical outlet floor box including means removably to secure a floor box cover assembly to the open end of the cylindrical housing member so that the upper surface of the cover assembly is parallel to the floor. Another principal object is that such means function independently of any angular orientation of the cover about the axis of the cylindrical box member and independently of the direction of tilt of the box.

Another object is to provide a method of installing an electrical outlet floor box in a poured concrete floor wherein the floor box cover assembly may be secured to the open end of the cylindrical member so that the upper surface of the cover assembly is parallel to the floor, without first having to determine the direction of tilt of the floor box.

These objects are attained by an electrical outlet floor box which includes an upright, open top cylindrical housing member, a cover assembly, and a ball ring to which is secured by suitable fasteners the cover assembly. By a double assembly of the ring and cover the axis of the ball ring is ensured normal to the plane of the cover, with the ring being secured to the inside of the box during the first assembly. The floor box may be embedded in a poured concrete floor and the excess portion of the cylindrical member cut off either flush with, or, a short, preselected distance from and parallel to the surface of the floor. The ball ring fits snugly and is universally angularly positionable within the cylindrical member, thereby enabling the attached cover to be positioned flush with the cut end of the cylindrical member or the floor, in which position the ball ring is solvent cemented to the inside walls of the cylindrical member.

Other objects and advantages of the present invention will become apparent as the following description proceeds.

To the accomplishment of the foregoing and related ends of the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DESCRIPTION OF THE PREFERRED EMBODIMENTS

Figure 1:
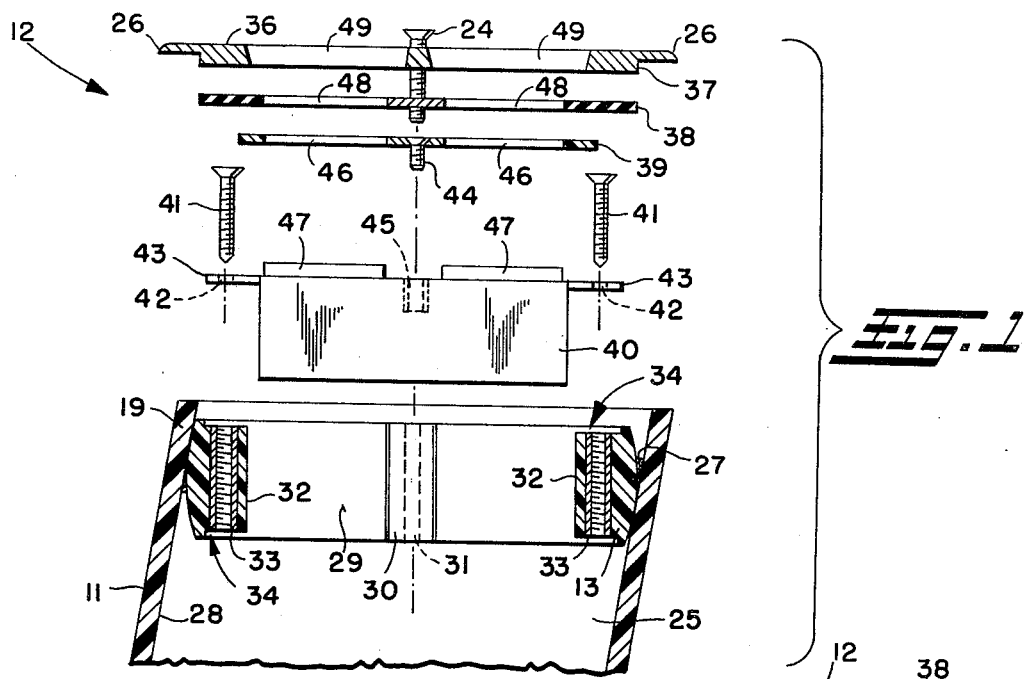
FIG. 1 is a fragmentary, exploded vertical section of the components of the present invention with the box or housing tilted.
Figures 2, 4:
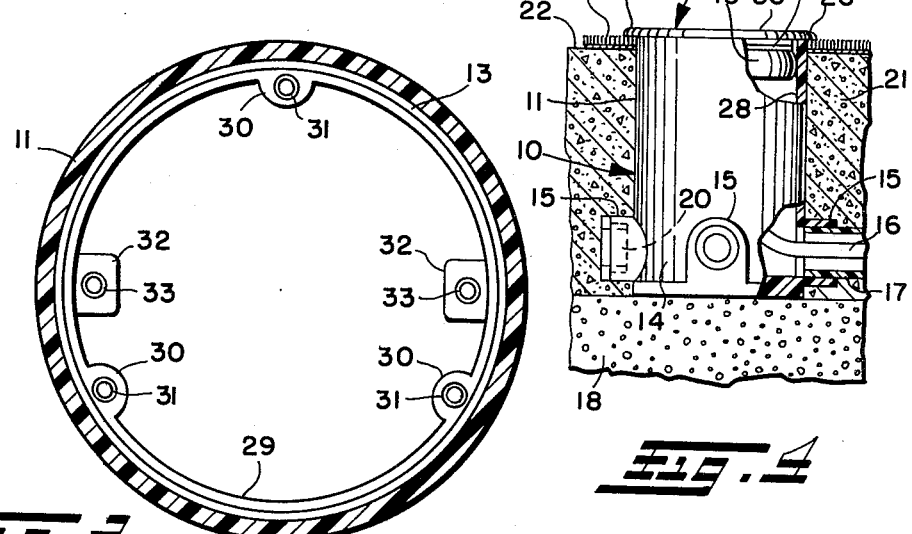
FIG. 2 is a horizontal section of a ball ring coaxially in place within a cylindrical member or box, with the cover and outlet removed as seen from the line 2—2 of FIG. 3.
FIG. 4 is a reduced fragmentary section showing an electrical outlet floor box installed in a poured concrete slab.

Referring now to the drawings, there is shown in FIG. 4 an electrical outlet floor box 10 comprising a hollow, open top, vertically extending cylindrical housing or box member 11, a cover assembly 12 (shown in an exploded view, in FIG. 1) and a ball ring 13. The base 14 of the cylindrical housing member may include four quadrant spaced sockets 15, each of which may accommodate electrical wiring 16 to or from conduit 17 connected to the sockets. The floor box 10 and conduit pipe are preferably constructed of a suitable plastic such as polyvinyl chloride or ABS.

Figure 3:
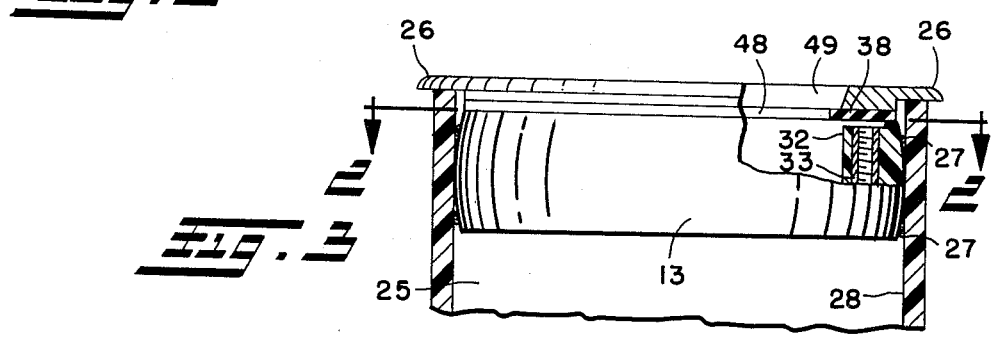
FIG. 3 is a fragmentary, vertical section of the top of a box assembled with a cover, with the box not being substantially tilted.

The cylindrical housing member 11 may be set in place in an upright position on a form or slab sub-base 18 with a temporary, protective cover over the top end 19 to keep concrete out of the interior of the housing 11. Then, the desired number of conduits 17 and plugs 20 for the unused sockets 15 may be inserted into the floor box whereupon, a concrete floor 21 may be poured around the floor box, usually below, but not higher than the covered top end. If the thickness of the poured floor is such that an excess of the cylindrical housing member projects above the surface 22 of the floor, then, after taking into account any flooring material 23 which is to be placed on such surface, the excess length of the cylindrical housing member may be sawed off either flush with, or, a short, preselected distance above and parallel to the surface 22. The cover assembly 12 may be threadingly secured to an axial end of the ball ring 13 by fasteners 24, whereupon, the ball ring may be inserted a distance into the interior 25 of the cylindrical housing member 11 through its open upper end 19 until the flanged portion 26 of the cover assembly is flush with the finished surface of the floor as shown in FIG. 4, or, until it is flush with the open end of the cylindrical member as shown in FIG. 3, whereupon, the ball ring may be solvent cemented, as indicated at 27, to the inside wall 28 of the cylindrical housing member, as shown in FIG. 3.

The ball ring 13, shown in FIGS. 1-4, is a ring-like section of a sphere taken equal distances above, below, and including a great circle of the sphere. The maximum outside diameter of the ring is the same as or just slightly more than the inside diameter of the cylindrical housing member 11, to ensure that the ring snugly fits within the cylindrical housing member as shown. The inside surface 29 of the ball ring is substantially cylindrical, as seen in FIGS. 1 and 2, and the radial thickness of the ring is thin relative to its diameter. As seen in FIGS. 1 and 2, projecting inwardly from and integral with the inside surface 29 of the ball ring are three equally circumferentially spaced radial extensions 30. Into each radial extension 30 a metal, female threaded socket insert 31 may be press-fit to be axially parallel with the axis of ball ring 13. Two additional somewhat larger projections 32, integral with the inside surface 29 of the ball ring and diametrically opposite each other, are provided with press-fit, female threaded socket inserts 33. The larger projections are recessed as seen at 34 to accomodate at each axial end the ears or projecting flanges 4 a receptacle. In spite of the projections, the center of the ring is substantially open readily permitting an electrician to insert his hand to remove and replace wires after having connected a receptacle.

The cover assembly 12 comprises a horizontally flat, circular cover plate 36 having three small openings which are aligned with the first mentioned three threaded inserts 31 in the ring. The outer under edge of the cover plate 36 is recessed forming a shoulder 37 of a diameter sufficiently small readily to fit within the open top of the box 11. A gasket 38 of roughly the same diameter as the shoulder and having three small holes which may be aligned with the three holes in the cover plate, and a circular support metal plate 39 are also included in the assembly.

An electrical receptacle 40 may be mounted in the interior of the ball ring and secured to the ring by threaded fasteners 41 which interact with two openings 42 in two metal flanges or ears 43 mounted on the receptacle and which are threadingly received by the inserts 33 in the axially recessed projections 32. The support plate 39 is secured to the upper side of the electrical receptacle by a fastener 44 which extends through the center of the support plate and is threadingly received by a female threaded socket 45 in the center of the receptacle. The support plate, in this embodiment, has two large oval-like openings 46 to allow access to the two plug-receiving portions 47 of the receptacle. Similarly, the gasket 38 and cover plate 36 each include two oval-like openings 48 and 49 respectively, to allow access to the two plug-receiving portions 47 of the receptacle 40.

It will be appreciated that the ball or leveling ring 13 may include additional projections 30 and inserts 31 to accommodate other types of cover assemblies made by various manufacturers and, of course, other than the two outlet receptacles illustrated. It will also be appreciated that there are various ways in which the outlet box may be installed and completely assembled with a cover assembly.

As a preferred installation procedure the box section 11 may be secured to the slab or form 18 in the proper position with the desired electrical conduits 17 installed. A temporary cover is placed securely on top of the box.

After the concrete has set, the temporary cover is removed and discarded. The installer will then saw the box flush with the floor. If the installer knows that carpeting is to be employed, he will preferably cut the box off so that it extends approximately half the thickness of the carpet and padding above the concrete. For this purpose, the installer may use a shim positioned on the concrete floor around the box to guide the saw in making the cut parallel to the surface 22.

The installer then assembles the cover plate 36 and gasket 38 and secures both to the ball or leveling ring 13.

When the three parts indicated have been assembled, the installer applies a solvent cement to the outer spherical surface of the ball or leveling ring 13 as indicated at 27 and inserts the assembly into the top of the box section so that the cover plate 36 is flush with the finished floor or with the top of the box if carpet is employed. The installer then allows the solvent cement to set. The insured tight fit of the ball ring within the interior of the box and the solvent cement creates a water seal between the box and ring.

Now, to install the receptacle, the installer simply removes the screws 24 and removes the cover plate and gasket from the leveling or ball ring 13. The installer then removes the wires 16 which have been fished through the conduits 17 and electrically connects the wires to the receptacle 40. The receptacle 40 is then installed in place utilizing the fasteners 41 extending through the holes 42 in the ears 43 and into the inserts 33 in the projections 32. The support plate 39 is then secured to the top of the receptacle utilizing the screw 44 and the tapped hole 45. The gasket and cover plate are then reinstalled utilizing the fasteners 24 threaded into the inserts 31 in the projections 30. If carpeting is employed, the flange 26 of the cover plate 36 will compress and grip the carpeting so that the top of the carpeting is substantially flush with the top of the cover plate.

The support plate 39 acts as an under support for the gasket 38 and both the gasket and the solvent cement act as dams preventing the entry of water or dirt into the receptacle.

It will also be appreciated that the receptacle may be included when the cover plate gasket and leveling ring are first assembled and the ball or leveling ring is secured to the inside of the box. The receptacle may then be removed later to be electrically connected and reinstalled. In any event, the installer does not have to rotate the cover plate and ring assembly to find the proper position parallel to the surface 22 or the upper edge of the box. It can also be seen that the cover plate acts a jig when secured to the leveling ring to insure its proper position when it is secured to the inside of the box upon the first assembly step. The subsequent disassembly and reassembly readily permits the receptacle to be electrically connected and installed.

Other modes of applying the principles of the invention may be employed, change being made as regards the details described, provided the features stated in any of the following claims or the equivalent of such be employed.

Having thus described my invention, what is claimed is:

1. An electrical outlet floor box comprising an open top vertically extending circular cylindrical plastic housing adapted to be cut off substantially flush with or slightly above and parallel with a floor surface, a cover assembly including a cover of a larger diameter than the inside diameter of said cylindrical housing and adapted to be positioned flush against the top of said cylindrical housing after said cylindrical housing has been cut off, a plastic ball ring having a generally spherical outside surface, the largest diameter of which is substantially the same as the inside diameter of said cylindrically housing, and means releasably to secure said ball ring to the underside of said cover assembly in proper position whereby the ball ring may be positioned inside the top of the cylindrical housing and held in place for solvent cementing with the cover serving as a jig to hold the ball ring within the top of said cylindrical housing with its axis normal to the floor, said means releasably to secure said ball ring to said cover assembly comprising threaded fasteners extending through said cover assembly and axially into said ball ring through complementary threaded sockets substantially parallel to the axis of the ball ring.

2. An electrical outlet floor box as set forth in claim 1 wherein said ball ring comprises a ring-like section of a sphere taken a distance above, below and including a great circle of the sphere.

3. An electrical outlet floor box as set forth in claim 2 including projections from the inner wall of the ball ring including said threaded sockets adapted to receive said fasteners.

4. An electrical outlet floor box as set forth in claim 3 wherein said projections are three in number and equally circumferentially spaced.

5. An electrical outlet floor box as set forth in claim 4 including two additional diametrically opposed projections from the inner wall of the ball ring to which an electrical receptacle is adapted to be secured.

6. An electrical outlet floor box as set forth in claim 4 wherein said cover assembly includes access openings adapted to provide access to an electrical receptacle.

7. An electrical outlet floor box as set forth in claim 1 wherein said cover includes a gasket adapted to be positioned between the top of the cylindrical housing and the underside of the cover.

8. An electrical outlet floor box as set forth in claim 7 wherein said ball ring includes means releasably to support an electrical receptacle, and access openings in said cover and gasket adapted to provide access to said receptacle.

* * * * *